(12) United States Patent
Jun et al.

(10) Patent No.: US 8,566,462 B2
(45) Date of Patent: Oct. 22, 2013

(54) METHODS OF CONTROLLING ACCESS TO NETWORK CONTENT REFERENCED WITHIN STRUCTURED DOCUMENTS

(75) Inventors: Gyuchang Jun, Sunnyvale, CA (US); Kurt Huang, Mountain View, CA (US); Duane Kuroda, Campbell, CA (US)

(73) Assignee: Digital River, Inc., Minnetonka, MN (US)

( * ) Notice: Subject to any disclaimer, the term of this patent is extended or adjusted under 35 U.S.C. 154(b) by 664 days.

(21) Appl. No.: 11/432,156

(22) Filed: May 10, 2006

(65) Prior Publication Data

US 2006/0259492 A1  Nov. 16, 2006

Related U.S. Application Data

(60) Provisional application No. 60/680,263, filed on May 11, 2005.

(51) Int. Cl.
*G06F 15/16* (2006.01)

(52) U.S. Cl.
USPC ........... 709/229; 709/203; 709/217; 709/225; 713/159; 713/172; 713/185; 726/9

(58) Field of Classification Search
USPC .......... 709/203, 225, 231, 238, 229; 713/159, 713/172, 185; 726/9
See application file for complete search history.

(56) References Cited

U.S. PATENT DOCUMENTS

| | | | |
|---|---|---|---|
| 6,360,254 B1 * | 3/2002 | Linden et al. ................. | 709/219 |
| 6,484,197 B1 | 11/2002 | Donohue | |
| 6,505,300 B2 | 1/2003 | Chan et al. | |
| 6,715,082 B1 * | 3/2004 | Chang et al. ..................... | 726/8 |
| 6,718,328 B1 * | 4/2004 | Norris ............................. | 707/9 |
| 6,779,115 B1 * | 8/2004 | Naim ............................. | 713/192 |
| 6,868,403 B1 | 3/2005 | Wiser et al. | |
| 6,948,061 B1 * | 9/2005 | Dierks ........................... | 713/159 |
| 7,454,356 B2 * | 11/2008 | Fields et al. ...................... | 705/1 |
| 7,603,469 B2 * | 10/2009 | Fletcher et al. ............... | 709/229 |
| 7,962,415 B2 * | 6/2011 | Gupta et al. .................... | 705/51 |
| 8,005,224 B2 * | 8/2011 | Nakhjiri et al. .............. | 380/272 |
| 8,051,491 B1 * | 11/2011 | Cavage et al. ................. | 726/30 |
| 8,095,972 B1 * | 1/2012 | Floyd et al. ...................... | 726/9 |
| 8,281,136 B2 * | 10/2012 | Ramakrishna ................ | 713/172 |
| 8,316,091 B2 * | 11/2012 | Hirvela et al. ............... | 709/206 |
| 8,333,317 B2 * | 12/2012 | Buer et al. ..................... | 235/380 |
| 8,447,858 B1 * | 5/2013 | Venkatraman ................ | 709/225 |
| 2001/0045451 A1 * | 11/2001 | Tan et al. ...................... | 235/375 |
| 2002/0177433 A1 * | 11/2002 | Bravo et al. .................... | 455/411 |
| 2003/0037070 A1 | 2/2003 | Marston | |
| 2003/0061250 A1 * | 3/2003 | Fujita et al. ................... | 708/250 |
| 2003/0099353 A1 * | 5/2003 | Goh et al. ........................ | 380/51 |
| 2003/0120943 A1 * | 6/2003 | Hughes ........................ | 713/193 |
| 2004/0243475 A1 * | 12/2004 | Aronsson et al. .............. | 705/26 |
| 2005/0060389 A1 * | 3/2005 | Cherkasova et al. .......... | 709/220 |
| 2006/0059346 A1 * | 3/2006 | Sherman et al. .............. | 713/175 |

(Continued)

*Primary Examiner* — Michael Won
(74) *Attorney, Agent, or Firm* — Billion & Armitage; Richard E. Billion

(57) ABSTRACT

Methods, apparatuses and systems directed to methods of controlling access to one or more items of network content referenced within a structured document such as an RSS feed. Embodiments of the invention are particularly suited to podcasting, where the access control is based on monetary payment, presentation of coupons or other promotional devices, or other forms of web commerce; or may limit the duration of accessibility of the content, the number of times it can be downloaded, or other characteristics of access.

16 Claims, 6 Drawing Sheets

(56) References Cited

U.S. PATENT DOCUMENTS

| | | |
|---|---|---|
| 2006/0085862 A1 | 4/2006 | Witt et al. |
| 2006/0095779 A9 * | 5/2006 | Bhat et al. .................... 713/182 |
| 2006/0184997 A1 * | 8/2006 | La Rotonda et al. ............. 726/2 |
| 2006/0190616 A1 * | 8/2006 | Mayerhofer et al. ......... 709/231 |
| 2006/0225138 A1 * | 10/2006 | Toyohara et al. ............... 726/27 |
| 2007/0219908 A1 * | 9/2007 | Martinez ......................... 705/51 |
| 2008/0183628 A1 * | 7/2008 | Oliver et al. .................... 705/71 |

* cited by examiner

METHODS OF CONTROLLING ACCESS TO NETWORK CONTENT REFERENCED WITHIN STRUCTURED DOCUMENTS

CROSS REFERENCE TO RELATED APPLICATIONS

This application claims priority to U.S. Provisional Patent Application No. 60/680,263 filed on May 11, 2005.

BACKGROUND

Field of the Invention

The invention relates to methods of controlling access to network content within structured documents, such as XML and "podcasting" RSS documents.

SUMMARY

The invention provides methods of controlling access to one or more items of network content referenced within a structured document such as RSS. Embodiments of the invention are particularly suited to podcasting, where the access control is based on monetary payment, presentation of coupons or other promotional devices, or other forms of web commerce; or may limit the duration of accessibility of the content, the number of times the content can be downloaded, or other characteristics of access.

DETAILED DESCRIPTION

Figure 1:
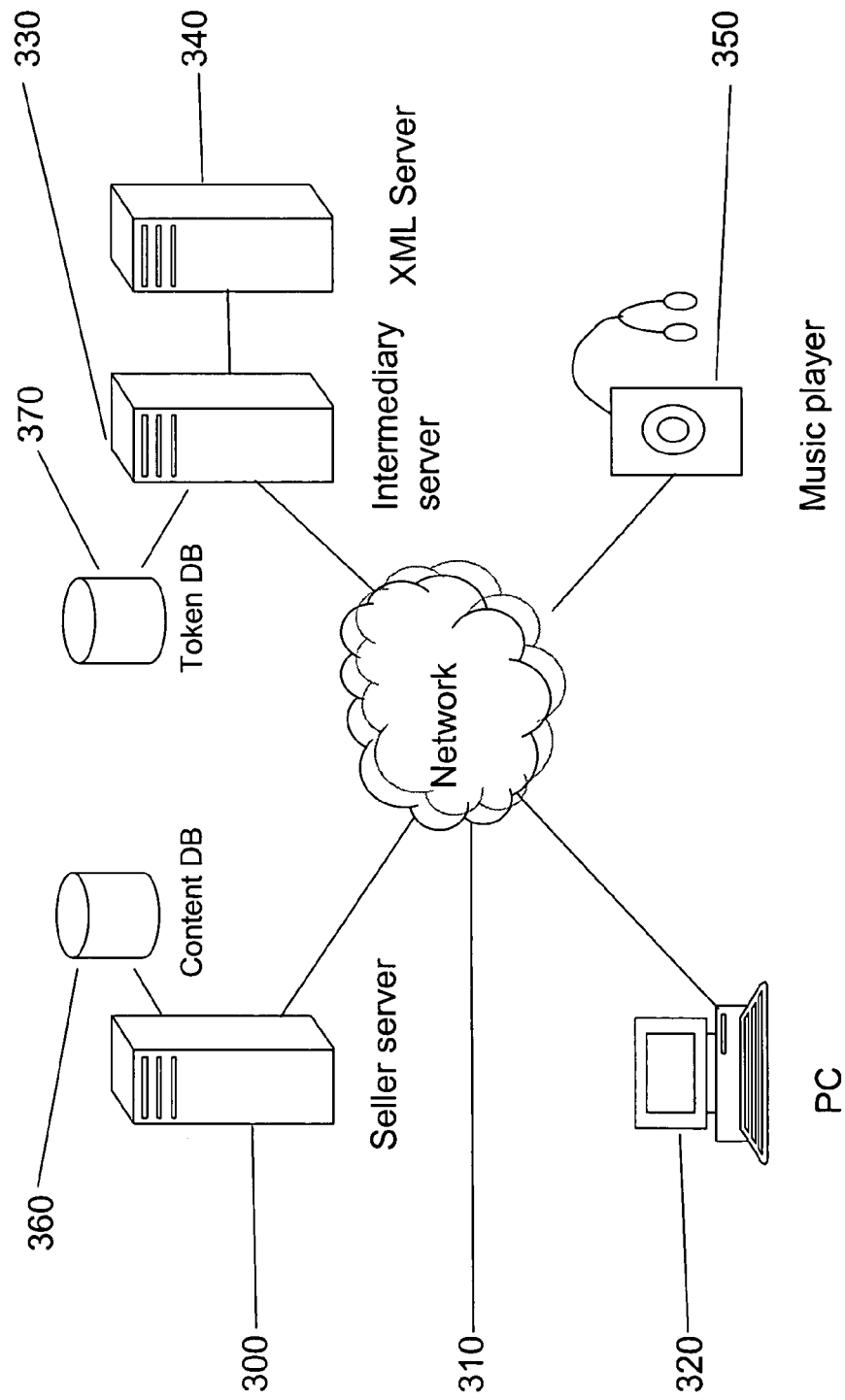
FIG. 1 is a diagram illustrating a network with attached servers belonging to seller and intermediary, personal computer, and personal music player.

Extensible Markup Language, abbreviated XML, when used here, is understood broadly to describe a class of data objects called XML documents. XML is an application profile or restricted form of SGML, the Standard Generalized Markup Language [ISO 8879]. By construction, XML documents are conforming SGML documents.

RSS, when used here, is understood broadly to describe a family of XML file formats for web syndication used by news websites, weblogs, and other publishers of network content. The acronym stands for any or all of the following: Rich Site Summary (RSS 0.9x), RDF Site Summary (RSS 0.9 and 1.0), and Really Simple Syndication (RSS 2.x). "Atom" is another RSS-like protocol. This information is delivered as an XML file called an RSS feed, RSS stream, or RSS channel.

HTTP (for HyperText Transfer Protocol) is the primary method used to convey information on the World Wide Web.

A Uniform Resource Locator, URL or Web address, is a standardized address for some resource (such as a document or image) on the Internet or elsewhere. First created by Tim Berners-Lee for use on the World Wide Web, the currently used forms are detailed by Internet standard RFC 1738.

An HTTP cookie (usually called simply a cookie) is a packet of information sent by a server to a World Wide Web browser and then sent back by the browser each time it accesses that server. Cookies are used by a server to maintain state between otherwise stateless HTTP transactions, and are often used for authentication, personalization, shopping baskets, and other information about the user accessing the server. RSS reader software, when used here, is understood broadly to refer to software which understands and is able to render or display one or more of the RSS family of XML formats. Such software need not and often does not have the full capabilities of a browser, particularly the ability to run Java, JavaScript, Flash, etc., and to handle cookies. Podcasting is a term of art referring to a protocol built on the RSS 2.0 protocol. Originally RSS was used as a way of syndicating traditional web content, such as HTML pages, but podcasting relies on the addition of an "enclosure" tag within an item of the XML document, which includes a link to a file, which could be an audio or video file, an image or download link, or any form of content addressable by a URL. Users of MP3 players are able to subscribe to a podcast by running RSS reader software, which allows fetching the files referenced by enclosure tags within the RSS document. A single podcasting "feed" may contain multiple enclosures. Video images have also been published via podcast.

A problem with RSS and, by extension, podcasting is that, typically, an RSS feed and all the items contained within the feed are free, and have no other forms of access control applied to them. Besides the cost of creating and offering the content itself, an RSS feed may impose other burdens on the content provider: RSS reader software may "poll" the feed so frequently to see if the information in the feed has changed that the provider's servers become overburdened, especially since there may be tens of thousands of subscribers running such software. These same limitations apply to podcasts, and may become more severe as the size of the podcasted files increases with the greater use of audio, video, and other media as podcast material, as the network overhead imposed by thousands of downloads may become quite significant. Thus there is a need for applying access controls of various types to RSS feeds and the content referenced therein. Such access controls should ideally be different, potentially, for each enclosure within a feed. These forms of access control are difficult with present RSS documents, since even if the RSS feed itself were to be access-controlled, which is not usually done, there is no mechanism by which the content within the feed can be controlled, as the RSS reader software may not be a JavaScript-capable or cookie-aware browser.

The invention provides methods, apparatuses and systems by which a structured document, such as an RSS feed or podcast, containing references to one or more items of network content, may have various forms of access control applied to the content. These access controls include ensuring that the customer has paid for the content; enforcing limitations on the length of time during which the content is available, the number of downloads, the number of IP addresses from which downloads may be initiated; or any other form of control. Access control may be "chained," i.e. carried forward from the structured document itself to the items contained within the document, so that these items, which may be subsequently retrieved by software other than a conventional browser, are still access controlled. Alternatively, access control may be applied individually to one or more of the items described by the enclosures of the structured document.

The term "server", when used here, is broadly understood to mean any computing entity or family of such entities capable of responding to user requests over a network. The computing entities may be computer servers or server farms, general purpose digital computers, personal digital assistants, special-purpose devices such as printers or scanners with digital processors built in, or specialized hardware devices such as XML chips or XML computers; either containing storage units or making use of storage units elsewhere on the network. The family of computing entities may be geographically distributed or may be "virtual" entities within a larger entity.

FIG. 1 illustrates a network 310, which may be a corporate network, privately operated commercial network, the Internet, or other form of network, with several devices attached to it. The seller server 300 is operated on behalf of a seller of network content. Attached to it is a storage unit 360 with a database of content offered by the seller. The server 330 is operated on behalf of an intermediary such as BitPass. Connected to 330 is a database 370 of tokens, tracking their validity, lifetime, number of accesses, and other relevant information. Server 330 may also utilize a specialized XML server 340. Embodiments of the invention are carried out by 300, 330, and 340 utilizing data on storage units 360 and 370. Users are connected to the network via a personal computer 320, personal music player 350, or other digital devices not shown.

The seller may wish to avoid the cost of maintaining databases of valid tokens, counting the number of times each token has been used, invalidating the token after its lifetime has expired, and other such overhead, and instead allow a third party on the web to perform these services for the seller. The invention provides methods whereby a third party may perform these token-validation services and replace the unique token with a "one-time token" whose construction is described herein. The seller authenticates the one-time token, a simple operation described herein.

The invention makes use of two forms of "token"; first, a digital identifier standing for the item of content, the user, the promotional offer, or other type of identification important to the seller; and second, a "one-time token" which is intended to be used once. A one-time token need not be secure against hackers or other parties capable of intercepting the traffic, since even if the token is copied or stolen, the token cannot be used again. For the one-time token, the seller recipient 300 of such token authenticates that the token is valid, as explained below.

A one-time token is constructed as follows:
token=hash(concatenate(seed, target, key, timestamp)),
where:
hash( ) is any suitable one-way function, such as the MD5 function as described in RFC 1321.
concatenate( ) is a string concatenation function, e.g. concatenate("A", "B")="AB"
seed=any randomly generated string
target=an identifier string to verify, e.g. the URL of the item
key=a secret shared between the parties, e.g. the intermediary 330 and seller 300
timestamp=a time window during which the token is valid. Often the timestamp is derived from the Unix time UT (the number of seconds since 00:00:00 UTC on Jan. 1, 1970) and an agreed-upon time-to-live (TTL), using the formula:
timestamp=UT−UT % TTL; for example, if UT were 93 seconds and TTL were 15, then timestamp=(93−93 mod 15), or 90, and remains 90 until UT reaches 105, so that the timestamp remains the same during the entire time window.

For example, if intermediary 330 desired to construct a one-time token to network content addressed by the URL 'http://seller.com/premium-url/', the target would be 'http://seller.com/premium-url/' and the one-time token would be encoded in a URL as 'http://seller.com/premium-url/?seed=xxx&token=yyyy', where 'yyyy' represents the result of the above calculation; or 'http:seller.com/premium-url/xxx/yyyy'. The seller's computer 300 validates this URL, using the method of FIG. 6.

Figure 6:
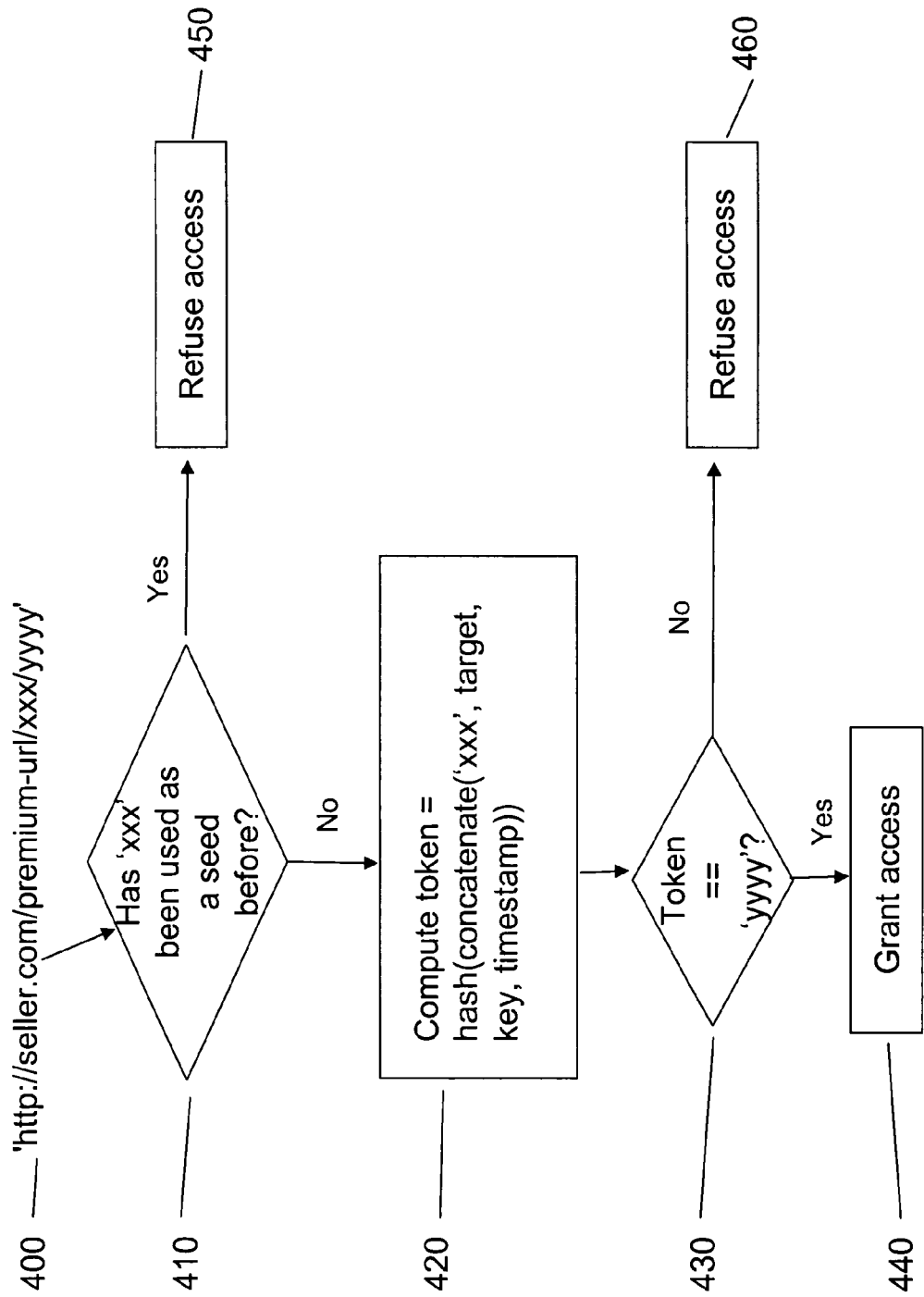
FIG. 6 is a diagram illustrating the steps of validating the one-time token.

In FIG. 6, the seller 300 validates the URL 400 containing the one-time token as follows: first, the seed 'xxx' is tested at 410 to see if the seed has been used before. Since the seed is a randomly generated string, the probability of the seed being used legitimately more than once is so small that such reuse can safely be assumed invalid, and thus, access is denied at 450. If the test 410 is passed, the token is recomputed, using the shared secret key, the target URL (e.g. http://seller.com/premium-url/) and the timestamp, which is computed in the same way as was done in the encoding process. The resulting token is compared to 'yyyy' at 430 and access is granted at 440 if token=='yyyy', and denied at 460 if token not=='yyyy'. Note that if the token is used at a time UT where UT−UT % TTL is greater than the timestamp with which the token was created, the comparison at 430 fails since the hash value is different.

Figure 2:
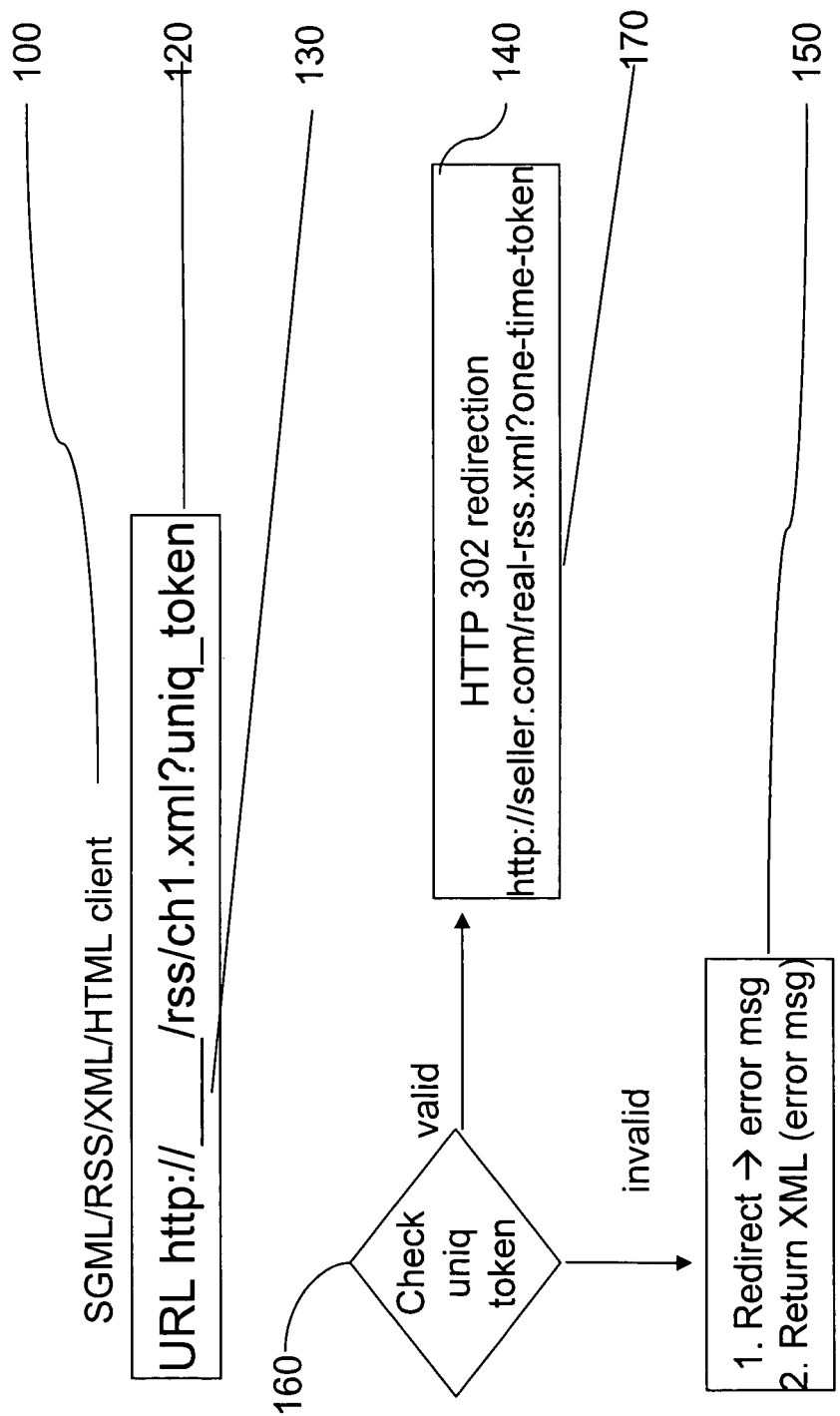
FIG. 2 is a diagram illustrating the steps followed in validating a unique token and returning a structured document containing URLs with one-time tokens for one or more of the items of network content, where the access control is chained to each of the items

FIG. 2 illustrates the flow of control when client software 100, such as a browser or RSS client running on 320, 350, or other digital device, attempts to access an RSS feed where all enclosures are to be made available if access is granted to the RSS feed itself, a technique called "chained access control". The RSS feed is addressed by URL 120, whose first component 130 may be that of a party other than the seller, such as intermediary 330, and whose last component after the '?' may contain the unique token which identifies the RSS feed, as previously illustrated. Note that the URL 120 need not be to the third party 330; the URL may in fact be to the seller server 300. BitPass.com is one such intermediary 330.

Figure 3:
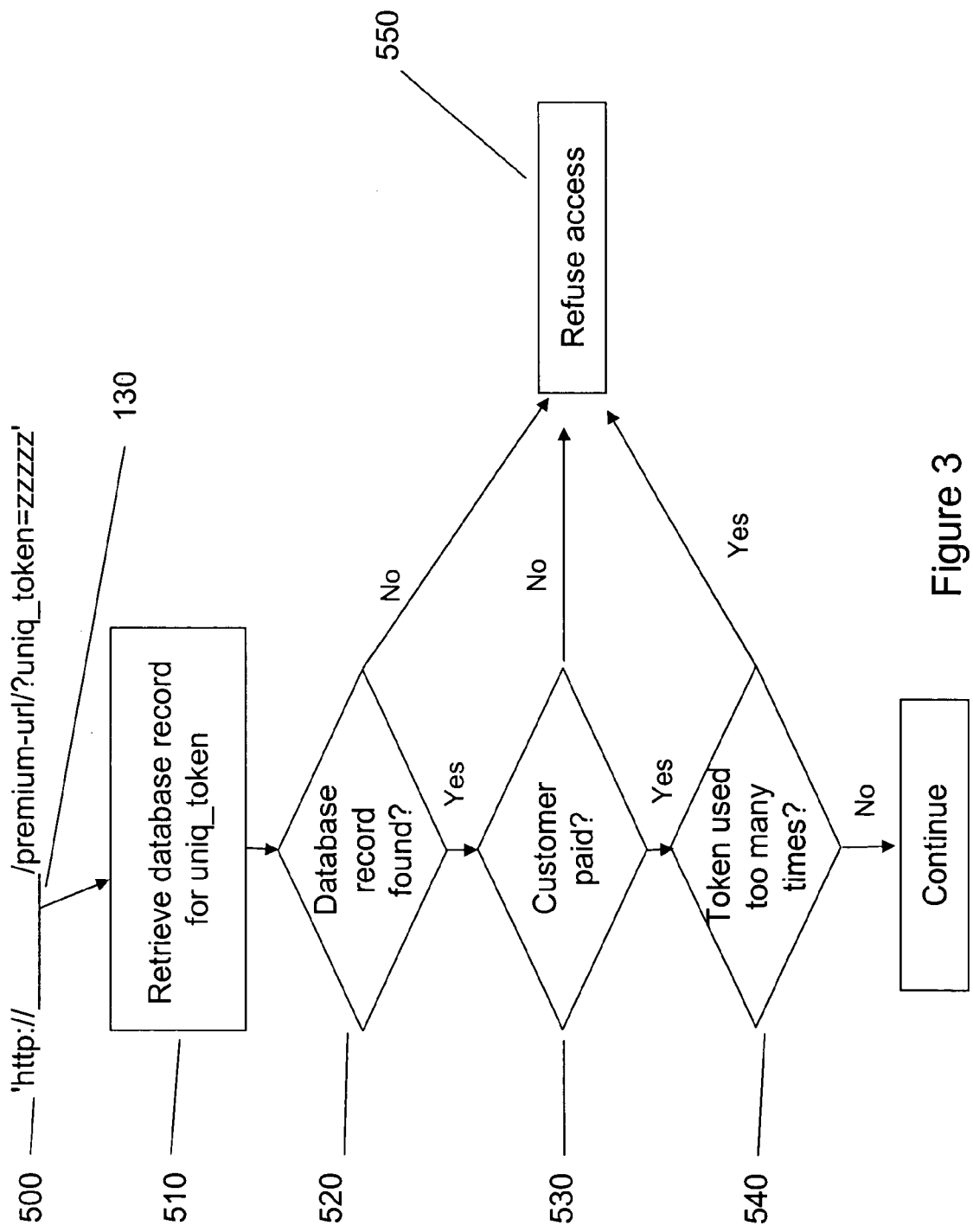
FIG. 3 is a diagram illustrating the steps of validating the unique token in more detail.

The client software 100 is thus directed to the net address of the host component of the URL 120. The logic check 160 is executed, wherein the unique token is validated as to the form of access control desired by the seller: checking payment status, number of uses, etc., using the database 370, a validation process illustrated in FIG. 3. If the unique token is valid, the branch 140 is taken, and a "redirect" code (HTTP code 302) is returned, redirecting the client to a URL 170 which is constructed to point to the location of the content 300, and includes a one-time token which is later validated as to its authenticity. If the unique token is invalid, branch 150 is taken. Two possible actions in 140 are shown: first, a HTTP code 302 redirection may direct the client to an error page, a page offering to accept payment for the content, a short promotional message, a short excerpt from the content, or other messages. It will be apparent to one skilled in the art that other forms of error processing are also possible.

Figure 4B:
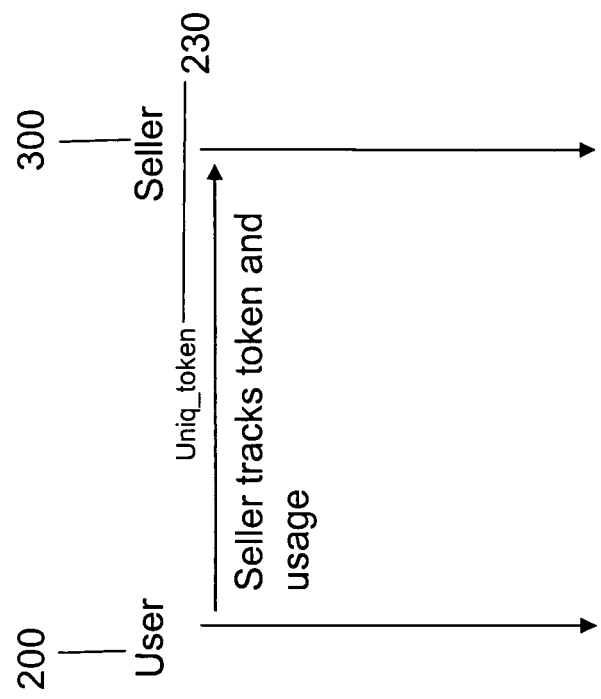
FIG. 4B is a diagram illustrating the steps followed when the seller offering the network content validates the unique token.
Figure 4A:
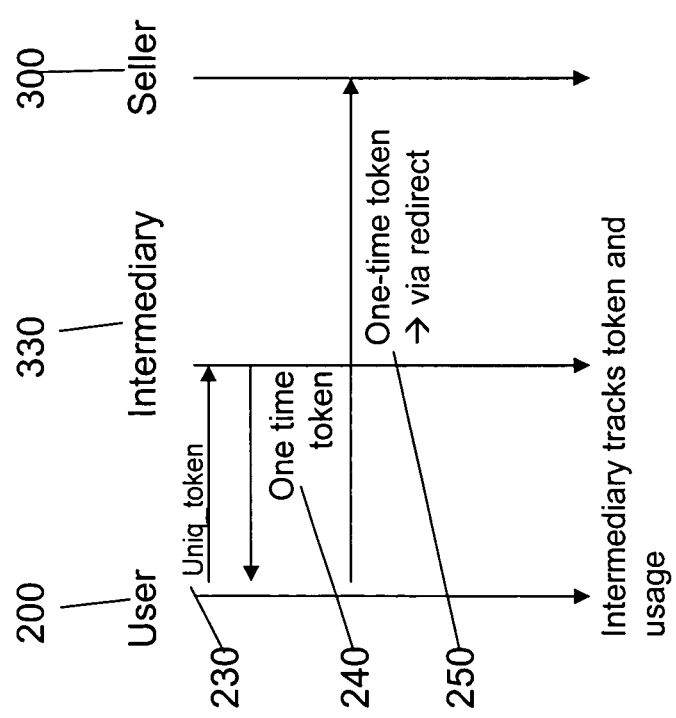
FIG. 4A is a diagram illustrating the steps followed when a party other than the seller of the network content validates the unique token and acts as intermediary.

FIGS. 4A and 4B illustrate the flow of control in two possible methods of validating the unique token and converting the unique token to a one-time token. In 4A, the intermediary 330 validates the unique token 230 as in FIG. 3, and, if valid, redirects the client 200 to a URL containing a one-time token 240. At 250, the client software at 200 then follows the redirected URL containing the one-time token. In this case, the intermediary 330 carries the burden of maintaining the database 370 of unique tokens and restrictions thereon and validating the unique token, relieving the seller 300 of that burden. In 4B, the seller 300 validates the unique token 230 as in FIG. 3.

Figure 5:
FIG. 5 is a diagram illustrating the steps followed when one-time tokens are generated separately for one or more items of the network content.

FIG. 5 illustrates flow of control when the individual enclosures within the RSS feed may each have their own form of access control and thus require their own one-time tokens. The client software 100 follows a URL 170 which contains a one-time token for the RSS feed itself. The logic check 175 is executed, wherein the one-time token is validated as in FIG. 6. If the one-time token is valid, the branch 180 is taken, in which a new RSS document is generated in which each of the enclosures may have a specific URL containing a one-time token.

The generation process at 180 in FIG. 5 may take as input the original RSS document, rewriting the document and changing the enclosure tags to reference unique URLs with one-time tokens; or the structured document may be generated directly from a database, flat file, or other information relevant to the seller. If the token is invalid, the branch 190 is taken, where three possible results are shown. First, an error code such as HTTP 402 (payment required) may be returned. Second, an RSS error message may be returned. Third, an RSS feed containing a URL pointing to "preview" versions of the network content may be returned. It will be apparent to one skilled in the art that many other possible courses of action exist at invalid branch 190.

Although structured documents may be podcasts, which rely on the RSS 2.0 specification which is based on XML, one skilled in the art will recognize that other forms of structured documents could also be used to publish multiple content items. A media syndication document could be built from another XML variant, from a variant of HTML such as CHTML or XHTML, the Wireless Appliance Protocol (WAP), or any other hierarchically structured document format.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A method of controlling access to network content, comprising steps of:
   receiving a unique token at a first server as part of a request from a client device;
   validating the unique token against an access control, the unique token identifying a structured document comprising syndicated network content;
   generating a one-time token enabling one-time use access to the structured document in response to the unique token being validated;
   forming a redirect uniform resource locator (URL) identifying a location for the structured document and containing the one-time token;
   redirecting the request to a second server along with the generated one-time token;
   authenticating that the one-time token is valid at the second server; and
   delivering the structured document to the client device when the one-time token is authenticated as valid.

2. The method of claim 1 further comprising a step of sending the redirect URL to a client device that requested validation of the unique token.

3. The method of claim 1 further comprising a step of:
   generating a uniform resource locator (URL) for information other than the structured document when the unique token for the structured document is invalid.

4. The method of claim 1 wherein the generating step is performed by an intermediary server other than a server operated by the seller of the syndicated network content.

5. The method of claim 1 wherein the structured document is a really simple syndication (RSS) formatted file.

6. The method of claim 1 wherein the validating step comprises checking the unique token against an access control based on payment.

7. The method of claim 1 wherein the generating step comprises generating the one-time token by a one-way hash function on arguments comprising:
   a randomly generated seed;
   a uniform resource locator (URL);
   a shared secret string; and
   a time window.

8. An apparatus operable on a server with a processor and a memory for providing control of access to network content, comprising:
   a validator containing program code which when executed by the processor in the server causes the server to perform operations of receiving a unique token at a first server as part of a request from a client device via a network and validating the unique token received against an access control utilizing a database containing tokens stored on the server, the unique token identifying a structured document containing syndicated network content; and
   a generator containing program code which when executed by the processor in the server causes the server to perform operations of generating a one-time token enabling one-time use access to the structured document in response to the unique token being validated, forming a redirect uniform resource locator (URL) identifying a location for the structured document and containing the one-time token, and redirecting the request to a second server along with the generated one-time token,
   wherein the second server comprises program code which when executed by the processor in the second server causes the second server to perform operations of authenticating that the one-time token is valid and deliver the structured document to the client device when the one-time token is authenticated as valid.

9. The apparatus of claim 8 wherein the generator comprises program code which when executed by the processor in the first server causes the first server to perform operations of sending the redirect URL to a client device that requested validation of the unique token.

10. The apparatus of claim 8 wherein the generator comprises program code which when executed by the processor in the server causes the server to perform operations of generating a uniform resource locator (URL) for information other than the structured document when the unique token for the structured document is invalid.

11. The apparatus of claim 8 wherein the apparatus comprises an intermediary server other than a server operated by the seller of the syndicated network content.

12. The apparatus of claim 8 wherein the structured document is a really simple syndication (RSS) formatted file.

13. The apparatus of claim 8 wherein the validator comprises program code which when executed by the processor in the server causes the server to perform operations of checking the unique token against an access control based on payment information.

14. The apparatus of claim 8 wherein the generator comprises program code which when executed by the processor in the server causes the server to perform operations of generating the one-time token with a one-way hash function on arguments comprising:
   a randomly generated seed;
   a uniform resource locator (URL);
   a shared secret string; and
   a time window.

15. An apparatus operable on a server with a processor and a memory for providing control of access to network content, comprising:
   a validator containing program code which when executed by the processor in the server causes the server to perform operations of validating a unique token received from a client device via a network against an access control utilizing a database containing tokens stored on the server, the unique token identifying a structured document comprising syndicated network; and
   a generator containing program code which when executed by the processor in the server causes the server to perform operations of generating a one-time token enabling one-time use access to the structured document in response to the unique token being validated, forming a redirect uniform resource locator (URL) identifying a location for the structured document and containing the one-time token, and sending on the network from the server to a second server the one-time token which has replaced the unique token and enables one-time use access to the structured document,
   wherein the second server authenticates that the one-time token is valid and delivers the structured document to the client device when the one-time token is authenticated as valid.

16. The apparatus of claim 15 wherein the apparatus comprises an intermediary server other than a server operated by the seller of the syndicated network content.

* * * * *